Figures 1, 30:
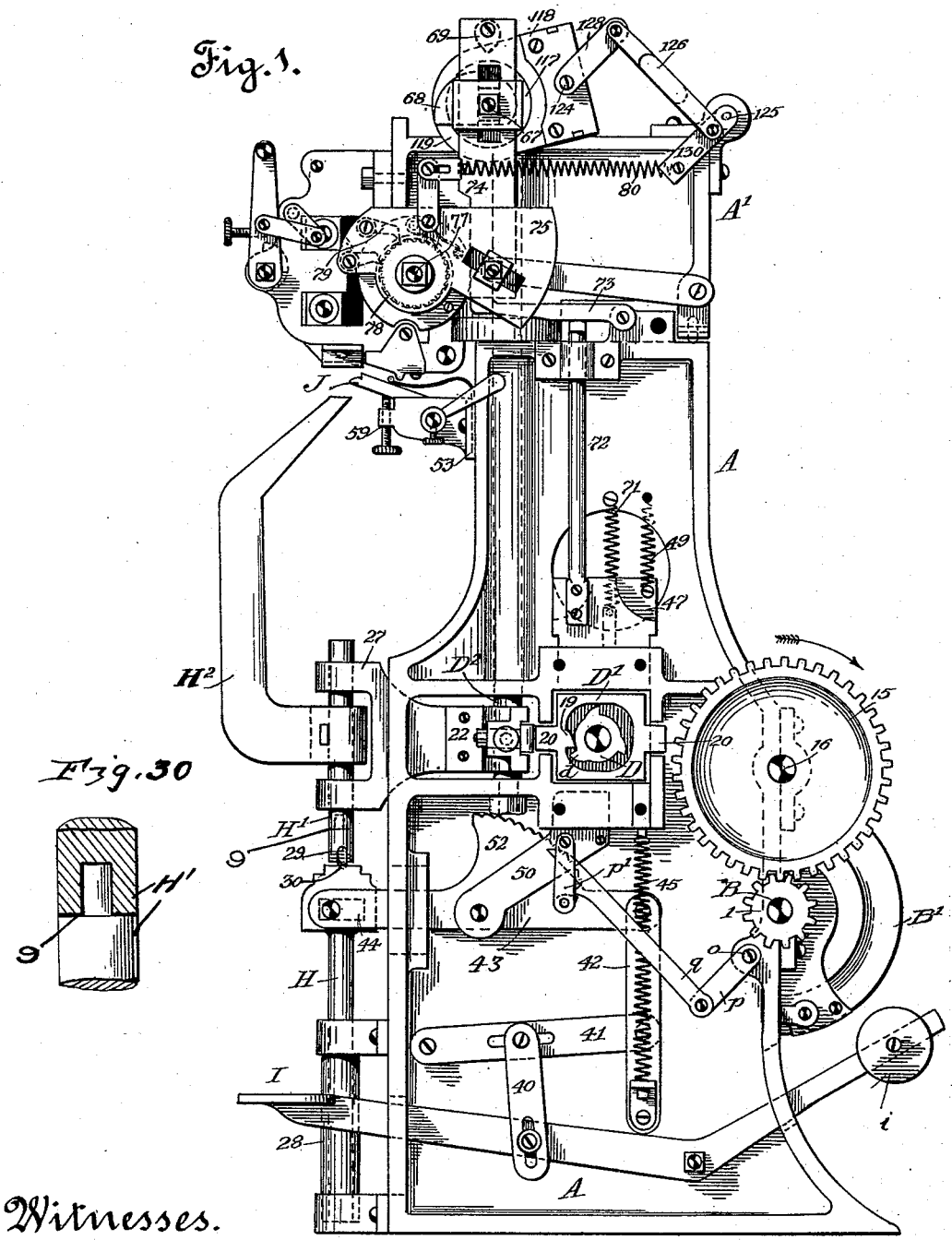

(No Model.) 7 Sheets—Sheet 1.
J. A. CAVALLI.
NAILING MACHINE FOR BOOTS OR SHOES.
No. 572,692. Patented Dec. 8, 1896.

Witnesses.
Inventor.

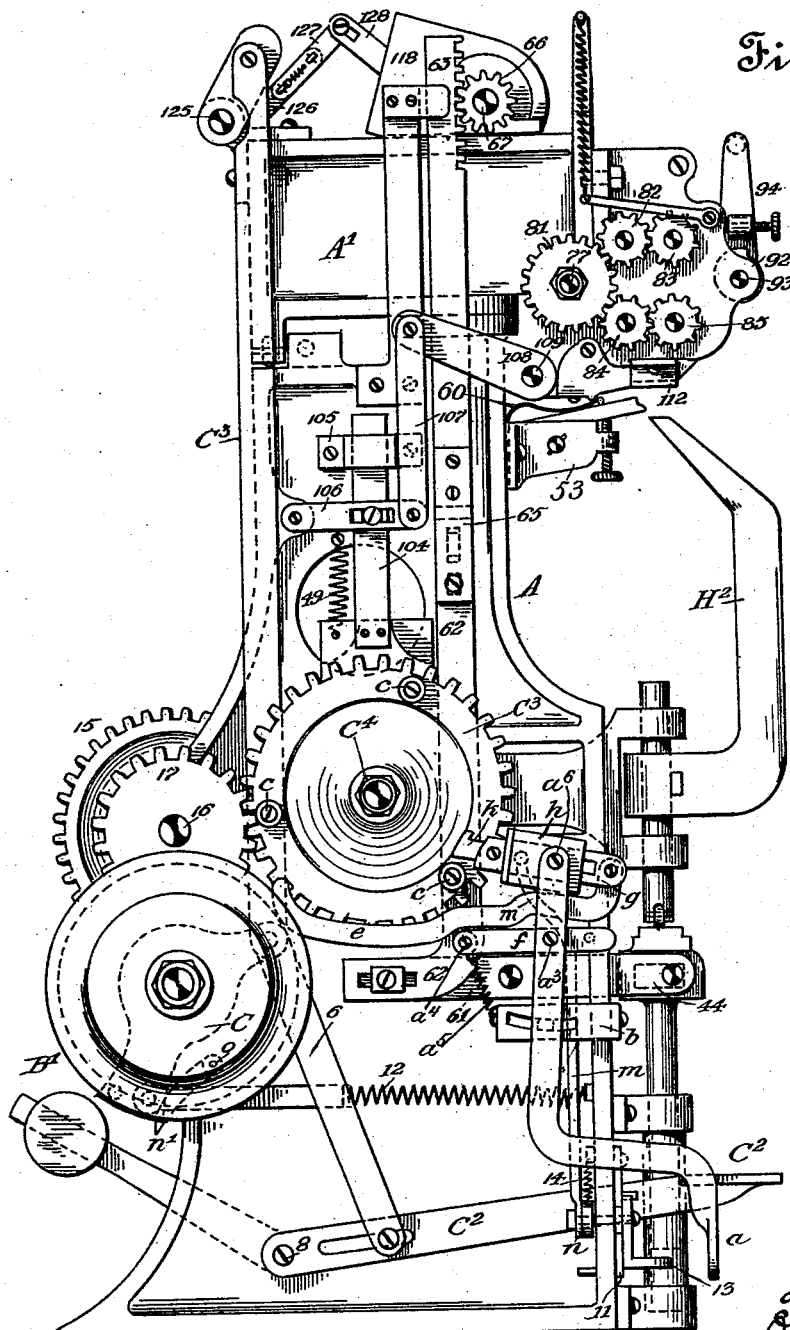

(No Model.) 7 Sheets—Sheet 3.

J. A. CAVALLI.
NAILING MACHINE FOR BOOTS OR SHOES.

No. 572,692. Patented Dec. 8, 1896.

Witnesses. Inventor.

(No Model.) 7 Sheets—Sheet 4.
J. A. CAVALLI.
NAILING MACHINE FOR BOOTS OR SHOES.
No. 572,692. Patented Dec. 8, 1896.
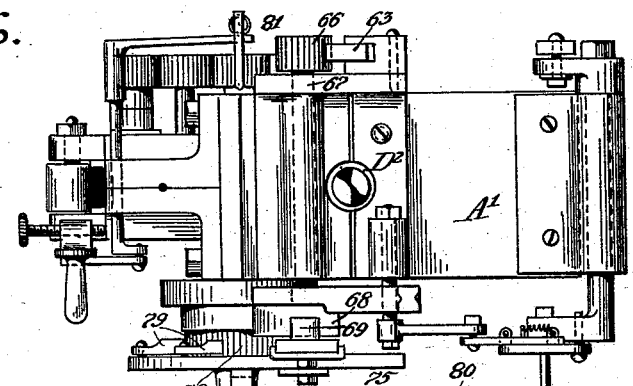
Fig. 6.
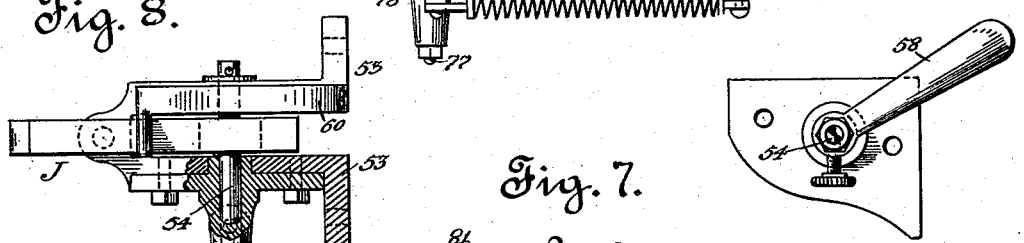
Fig. 8. Fig. 7. Fig. 10.
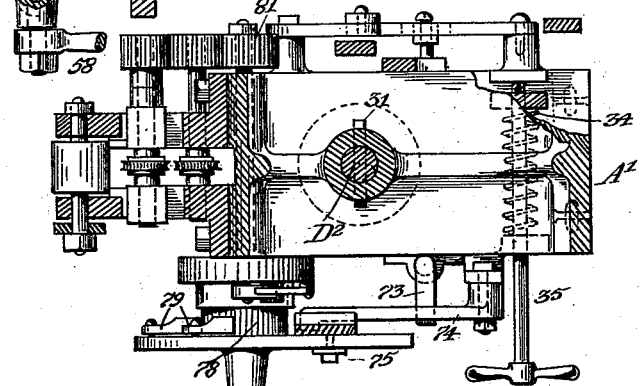
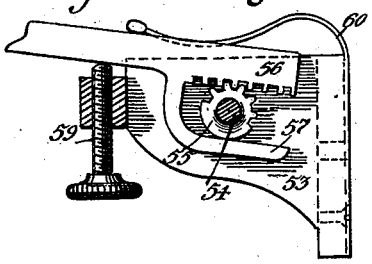
Fig. 9.
Witnesses. Inventor.
J. A. Cavalli
by Spear & Seely
Attorneys (No Model.) 7 Sheets—Sheet 5.
J. A. CAVALLI.
NAILING MACHINE FOR BOOTS OR SHOES.
No. 572,692. Patented Dec. 8, 1896.
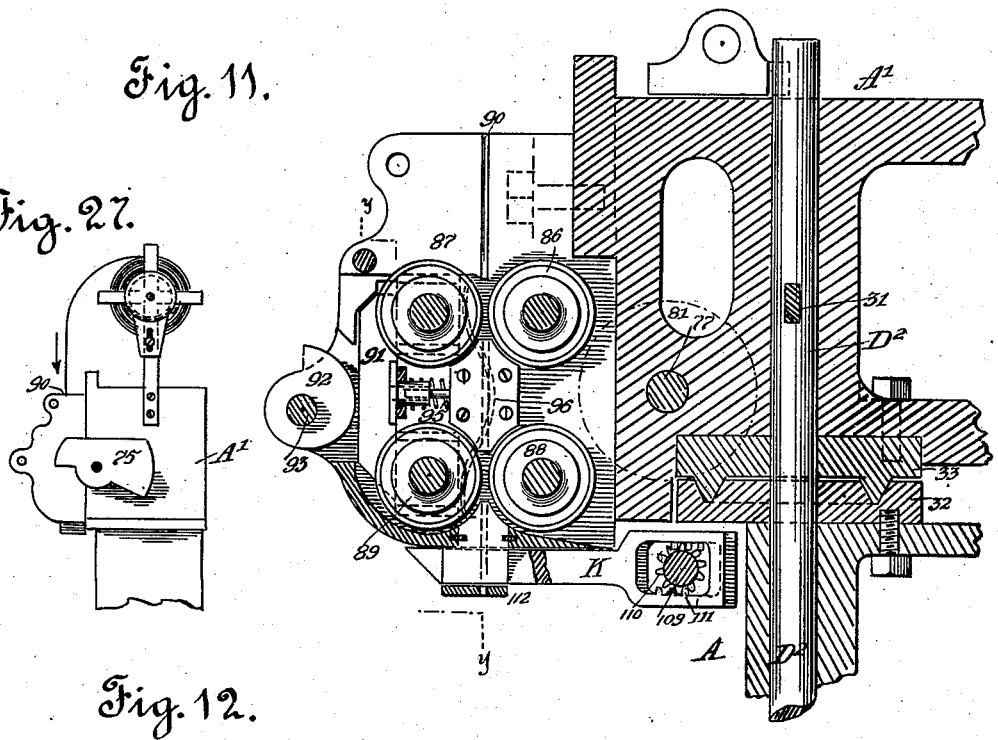
Fig. 11.
Fig. 27.
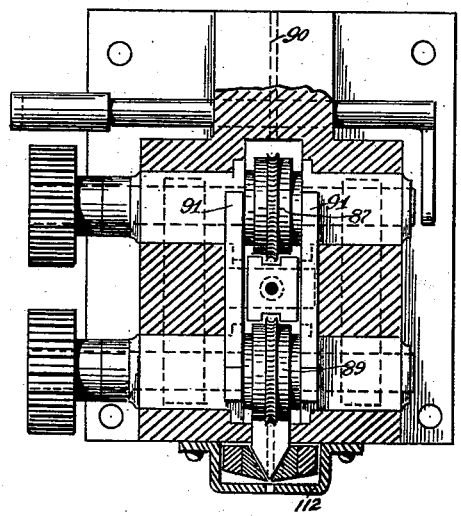
Fig. 12.
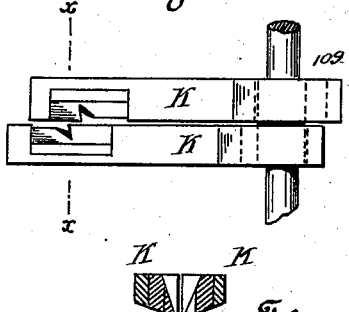
Fig. 13.
Fig. 14.
Witnesses.
H. Monteverdt
M. G. Loefler
Inventor.
J. A. Cavalli
by Spear & Seely
Attorneys
THE NORRIS PETERS CO., PHOTO-LITHO., WASHINGTON, D. C.

(No Model.) 7 Sheets—Sheet 6.

J. A. CAVALLI.
NAILING MACHINE FOR BOOTS OR SHOES.

No. 572,692. Patented Dec. 8, 1896.

Witnesses.
M. G. Loefler.
H. Monteverde.

Inventor.
J. A. Cavalli
by Spear & Seely
Attorneys (No Model.) 7 Sheets—Sheet 7.
J. A. CAVALLI.
NAILING MACHINE FOR BOOTS OR SHOES.
No. 572,692. Patented Dec. 8, 1896.
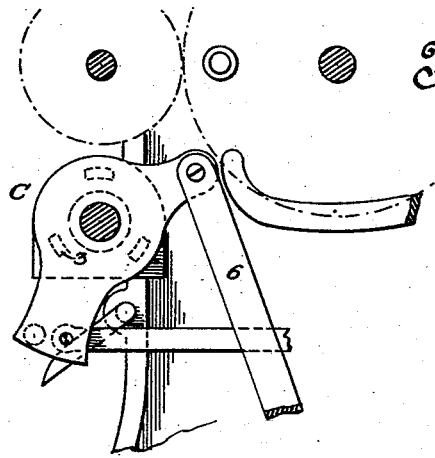
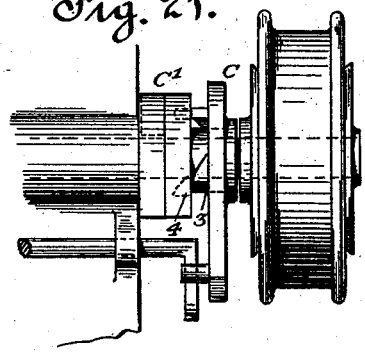
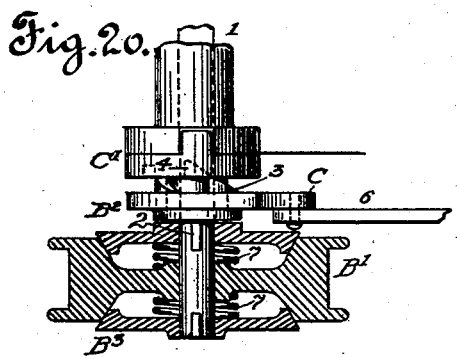
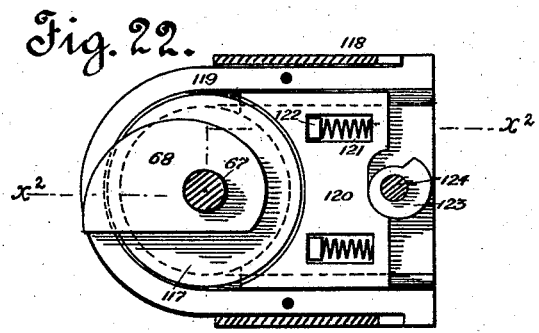
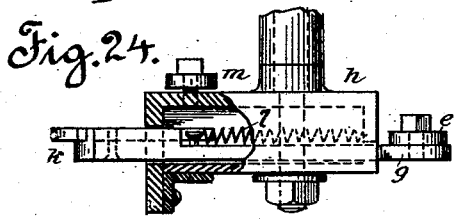
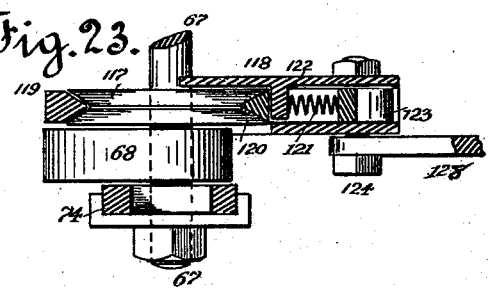
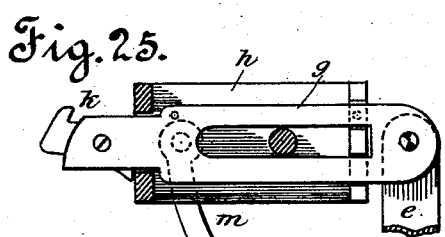
Witnesses.
F. Monteverde
M. G. Loeffler
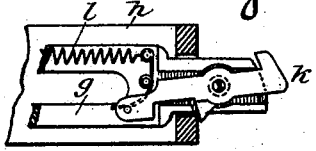
Inventor.
J. A. Cavalli
by Spear & Seely
Attorneys

UNITED STATES PATENT OFFICE.

JOSEPH ANDREA CAVALLI, OF SAN FRANCISCO, CALIFORNIA.

NAILING-MACHINE FOR BOOTS OR SHOES.

SPECIFICATION forming part of Letters Patent No. 572,692, dated December 8, 1896.

Application filed January 21, 1895. Serial No. 535,648. (No model.)

*To all whom it may concern:*

Be it known that I, JOSEPH ANDREA CAVALLI, a citizen of the United States, residing at San Francisco, in the county of San Francisco and State of California, have invented certain new and useful Improvements in Nailing-Machines for Boots or Shoes; and I do hereby declare that the following is a full, clear, and exact description thereof.

My invention relates to nailing-machines for inserting wire nails into boots and shoes for the purpose of securing the uppers to the soles; and my object is to provide a machine in which the operations of feeding the wire, driving it into shoes, and cutting it off close to the sole shall be automatically performed with much greater rapidity than is possible with machines at present in use. With the mechanism for performing these functions I also combine various special modes of adjustment by which the sizes of nails can be regulated according to the class of work to be done, thickness of the soles, &c., as well as for changing the spacing of the nails in the sole according to whether a greater or lesser number are required.

My invention also includes specially-devised cutters which by one operation cut off from the wire a nail just driven and form a chisel-point for the succeeding nail. It also includes special means for driving the machine and for throwing the driving-shaft into and out of gear with the connected mechanism either by the act of the operator or automatically, and, finally, it includes various special features of construction which need not be particularly referred to here, but which are fully hereinafter described, as well as shown in the accompanying drawings, in connection with which this specification should be read.

Figure 3:
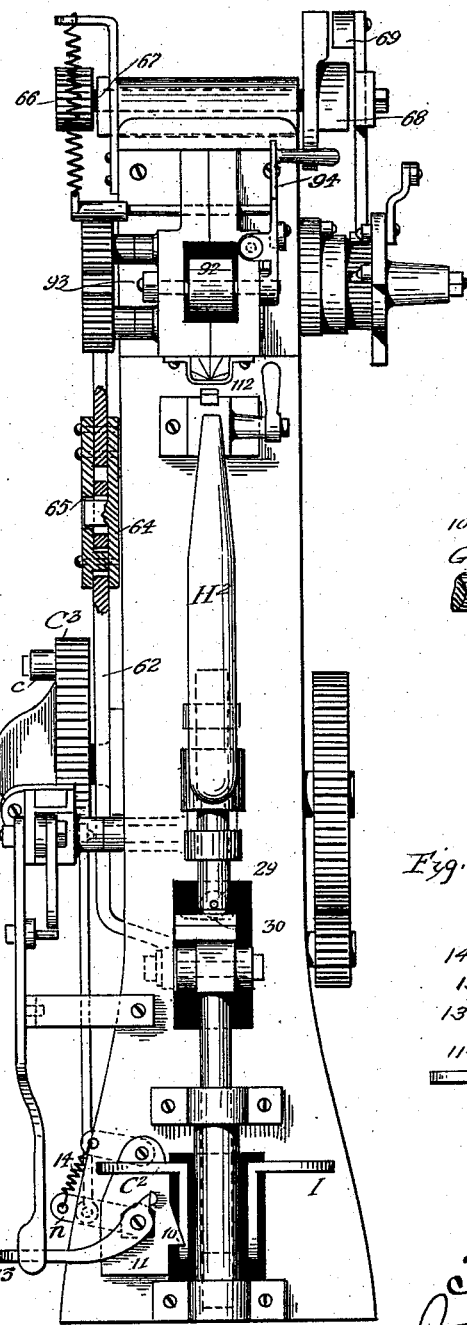
Figure 4:
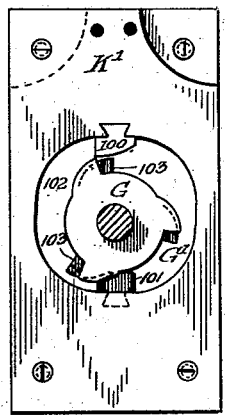
Figure 5:
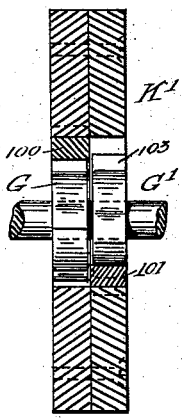
Figures 28, 29:
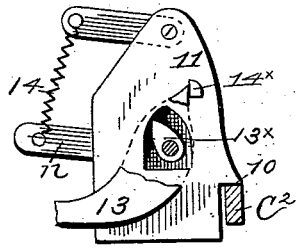
Figure 15:
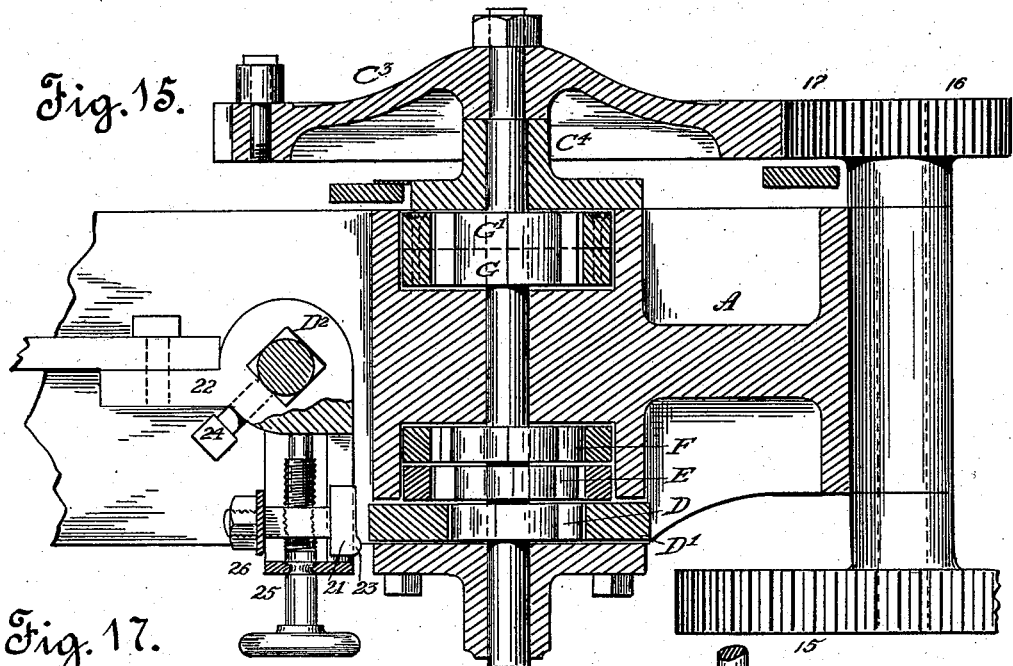
Figures 16, 17:
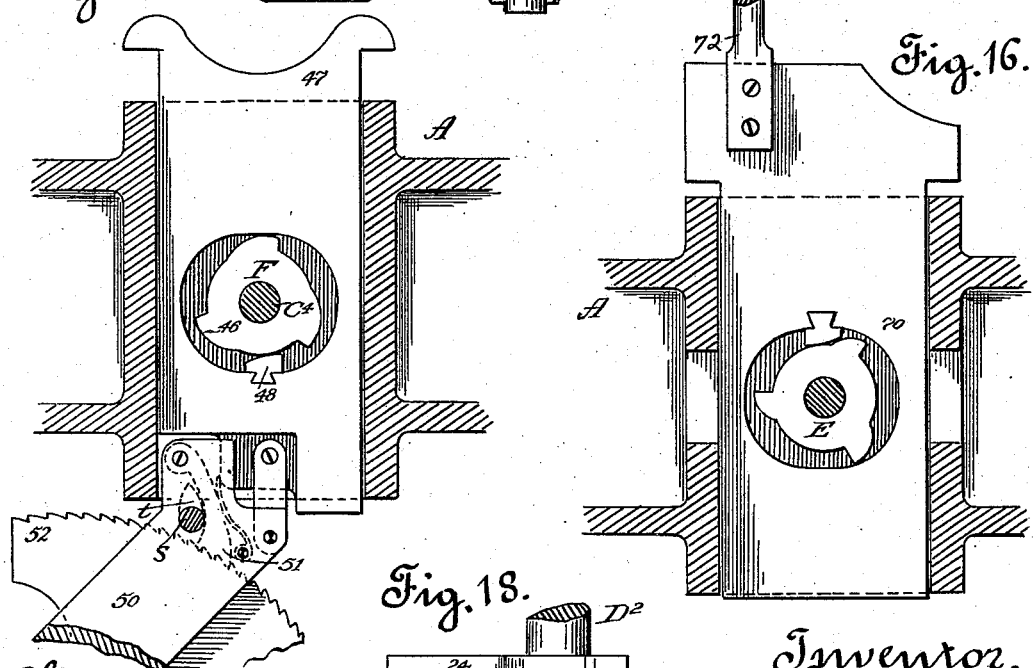
Figure 18:
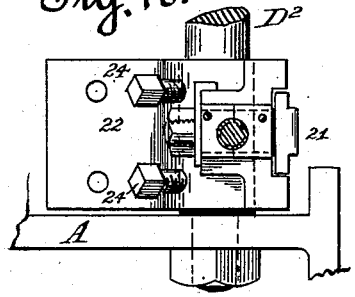

In the drawings, Figure 1 is an elevation of the right-hand side of the machine relatively to the front. Fig. 2 is a similar elevation of the left side. Fig. 3 is a front elevation. Fig. 4 is a detail front elevation of the double cam which operates the wire-cutters. Fig. 5 is a detail vertical sectional elevation of the same. Fig. 6 is a plan of the top of the machine. Fig. 7 is a sectional plan of the top of the machine with the top plate removed. Fig. 8 is a detail plan view of the shoe-guide. Fig. 9 is a front elevation of the same with its front plate removed. Fig. 10 is a detail of the front plate last named. Fig. 11 is a vertical section of the wire feeding and cutting mechanism. Fig. 12 is a sectional view on the irregular line $y\,y$ of Fig. 11. Fig. 13 is a plan view of the cutting-knives. Fig. 14 is a cross-section of the same in the line $x\,x$ of Fig. 13. Fig. 15 is a horizontal plan and section through the driving-cams. Fig. 16 is a detail elevation of the cam connected to the wire-feeding mechanism. Fig. 17 is a similar elevation of the cam for raising the standard which supports the shoe holder or horn. Fig. 18 is a front elevation of the cross-head for oscillating the upper part of the machine. Fig. 19 is a side elevation of the clutch forming part of the driving mechanism with the frictional driving-pulley removed. Fig. 20 is a plan of the same with the pulley in section. Fig. 21 is a front elevation of the same. Fig. 22 is a side elevation of brake mechanism. Fig. 23 is a top plan of the same, partly in section. Fig. 24 is a detail plan of the trigger. Fig. 25 is a front elevation of the same with the outer casing removed. Fig. 26 is a rear elevation of the devices shown in Fig. 25. Fig. 27 is a detail of top of machine, showing the reel for the wire. Fig. 28 is a detail front view of the device for releasing the treadle which controls the engagement of the driving-gearing. Fig. 29 is a detail vertical cross-section of Fig. 28. Fig. 30 is a detail sectional view of a portion of the standard H'.

Throughout the drawings, A represents the frame of the machine, by which all the operative parts are supported, and A' a movable upper extension of the same.

B is the driving-shaft, which is journaled transversely at the rear of the frame A and has keyed at one end the pinion 1, Fig. 1. At the other end of the shaft B is a loose flanged or dished belt-pulley B', having friction-surfaces on opposite sides. $B^2$ and $B^3$ are friction-disks having beveled edges, the former, $B^2$, secured to the shaft by feathers 2, so as to have a sliding motion thereon, and the latter or outside disk, $B^3$, secured to the shaft, Fig. 20.

C is a lever loose on the shaft and provided with inclines 3.

C' is a member of a clutch mounted upon the driving-shaft, which has inclined recesses 4 to receive the inclines 3.

A rod 6 connects the lever C to a slot in the treadle C², which extends to the front of the machine convenient to the operator. When this treadle is depressed and the lever C moved, the opposing inclines force the lever outward and against the inner friction-disk B². This forces said disk against the pulley B' and also forces the latter against the outer friction-disk B³, Fig. 20, so that it is secured to the driving-shaft by frictional contact upon both its beveled flanges, springs 7 between the pulley and disks being compressed. The treadle-lever is pivoted at 8 to the frame. When its forward end is depressed to start the machine, it catches under a notch 10 in a pivoted plate 11, and until it is released the machine will be in gear with the driving-shaft. The depression of the treadle extends a tension-spring 12, connected in front to the frame and at the back to the lever C, Fig. 2.

The friction-surfaces are therefore held in engagement against the tension of this spring. Should the tension be released, the spring 12, pulling on the lower end of the lever C, will disengage the frictional surfaces (by a movement the reverse of that described before) and will return the treadle to its original position, as in Figs. 2 and 3, where the machine is out of gear with its driving-shaft.

The treadle is released by the mechanism shown in Figs. 3, 28, and 29. The pivoted plate 11 has a slot 11$^\times$, through which passes a rock-shaft, on one end of which is a treadle 13. On the shaft of the treadle is a small cam 13$^\times$, which by the depression of the treadle is caused to bear on the edge of the slot and move the plate 11, releasing the treadle C² from the notch 10. The end of the treadle bears normally upon a stop 14$^\times$ on plate 11 and is held there by a spring 14, the cam being inactive until the treadle is depressed. The spring 14 extends from a convenient point in the main frame to the arm $n$ on the shaft or pivot of treadle 13. When the main treadle C² is released from the holding-plate 11, it is immediately raised by the recoil of the tension-spring 12. Automatic means are also provided for accomplishing the same result in case of accident to the machine or interruption in its proper operation, and such means will be hereinafter described. The connections just described are to put the starting and stopping of the machine under the control of the operator in its ordinary operation.

The pinion 1 on the driving-shaft gears into a spur-wheel 15, mounted upon a transverse shaft 16 at the rear of the main frame. At the other end of this shaft, that is, at the left of the machine as viewed from the front, is a pinion 17, which in turn drives the large gear-wheel C³ on the center shaft C⁴. From the continuous rotation of this shaft the operative parts of the machine derive their different automatic movements by means of a series of cams secured to said shaft and giving motion directly to the mechanisms for carrying out the whole process of nailing shoes.

Fig. 15 is referred to to give a clear understanding of the relative positions of the series of cams on the shaft. The cams are lettered D, E, F, G, and G', and their individual functions are as follows: Cam D operates connections which give a horizontal vibratory movement to the shoe holder or horn and a like movement simultaneously to the upper part A' of the frame, these movements accomplishing the proper spacing of the nails in the shoe. Cam E is connected to the mechanism for feeding the wire and forcing it into the shoe, such mechanism being carried by the upper or movable part of the frame. Cam F operates the connections by which the shoe holder or horn is pressed upward and held while being nailed. Cams G and G' form a double cam operating the reciprocating wire-cutters, which cut off the wire close to the shoe after it has been forced in and by the same operation form a chisel-point upon the end of the wire which forms the nail succeeding the one just driven. With these mechanisms are supplied various adjustments for adapting the machine to various kinds of shoes, to soles of different thickness, &c., all of which are hereinafter described in detail. All of these cams work in recesses in the solid part of the frame A, cams D, E, and F being placed close together at the right side of the frame and cams G and G' at the left of the frame, Fig. 15, it being understood that I refer to the right and left sides of the machine as viewed from the front. Referring first to the movements derived from the cam D, it will be seen that a slide D' surrounds the cam and is provided with an inwardly-projecting incline 19. The cam has similar projections $d$, (here shown as three in number,) so that three movements of the slide are produced by each revolution of the cam. The slide is provided with projections 20, which form guides for it as it moves in the frame. At each forward movement of the slide, that is, three times for each revolution of cam D, one of these projections strikes a block 21, adjustable in an angular pivoted lever 22, Fig. 15. The block 21 has a small projection 23. The movement of the slide D' is invariable; but the vibratory motion of the lever 22 can be changed by adjusting the block 21 nearer to or farther from the center of vibration, which is the vertical shaft D², to which the lever 22 is secured by set-screws 24. This adjustment is accomplished by means of a screw 25, which passes through a threaded opening in the block 21, the screw turning but not traveling in a bearing 26, formed in the end of the lever. The projection 23 can thus be brought nearer to or farther away from the center of oscillation, thus providing practically an adjustable lever of variable oscillation driven by a cam of constant stroke. The lever 22 extends forward and is secured to or forms a part of a yoke 27, projecting from the front of the machine, and secured to the upper part H' of the vertical standard H. Fig. 1 gives a clear view of this construction.

The standard H is stepped at its lower end in a long stationary sleeve 28, which permits of the requisite vertical movement hereinafter described. The standard H H' moves vertically as a whole, but only the part H' has the lateral horizontal sweep or oscillation communicated by the elbow-lever 22, as just described. This being the case, the lower end of the part H' has a roller 29, which rests in a depression or groove 30 at the top of part H and forms a guide for the oscillatory motion, the limit of which is the length of such depression. (See Fig. 3 for the best view of this feature.) The shoe holder or horn $H^2$ is secured to the standard H' and derives from it the same oscillating motion, as well as the vertical movement alluded to above.

It has been stated that the center of the oscillation produced by the cam D is the shaft $D^2$, secured to the lever 22 and stepped in the frame, as shown in Fig. 1. The shaft $D^2$ extends upward through the solid stationary part of the frame and into the movable or oscillating part A'. This part of the frame carries the wire cutting and feeding mechanism, and its movements must therefore be in exact unison with those of the shoe-horn, so that successive nails shall be spaced and driven at the proper intervals. The oscillating motion of the frame A' depends entirely upon the shaft $D^2$, and hence a single adjustment by the screw 25 will regulate the throw of both the shoe-horn and the top of the frame. The shaft $D^2$ is secured to the movable frame by the key 31. (See Fig. 11.) Two plates 32 33, one secured to frame A and the other to frame A', engage by means of a circular rib and groove and form a turn-table upon which the frame A', with all the mechanism supported by it, swings bodily, making three oscillations at each complete rotation of the driving-cam D, during which three nails are driven and cut off. These three positive strokes of the cam, which give the oscillating motion just described, are effected against the pressure of the returning-spring 34, Fig. 7, interposed between the movable and fixed parts of the frame, the pressure of which can be regulated by the projecting screw 35. This spring therefore returns the movable frame, its operating-shaft, the shoe horn and standard, and the lever 22 to position as soon as each projection on cam D has operated them in the contrary direction.

In addition to its vertical and oscillating movement the shoe-horn is mounted upon its supporting-standard so as to swing freely upon the arc of a circle and thus enable the operator to turn the shoe gradually around, so as to nail along the whole edge of the sole. This is accomplished by pivoting the part H' of the standard, as shown, at 9, Fig. 1, so that it can swing with the shoe-horn and at the same time oscillate.

The vertical movement of the standard and shoe-horn is originally given by the workman, after the shoe is placed upon the horn, by the treadle I. The purpose of this movement is to force the sole up against the shoe-guide J just below the point where the operation of nailing takes place. It is necessary that the shoe be held perfectly rigid while being nailed, and also after each nail is driven the shoe should yield a little, so that it can be put into position for receiving the next nail. This alternate pressure upward and yielding downward is automatically effected by the cam F, through proper connections, independently of the treadle I, which is only employed to raise the horn after a fresh shoe has been placed upon it. As the amount of vertical movement depends upon the thickness of the soles, I have provided an automatic adjustment or stop mechanism for limiting the upward motion at the proper time. First, as to the non-automatic raising of the shoe-horn standard. The treadle I is connected by a slot and pin to a link 40, which in turn is jointed to a pivoted lever 41. (See Fig. 1.) An arm 42 and centrally-pivoted lever 43 are connected to a boxing 44 on the shoe-standard. A tension-spring 45, connected to arm 42 and the main frame above it, returns the parts to the position shown in Fig. 1. The depression of the treadle through these connections will therefore raise the whole standard bodily, and the weight $i$ on the treadle-lever acts as a counterpoise and raises and keeps the treadle in the position shown in Fig. 1 while the machine is at work.

The automatic vibration of the shoe-standard is, as stated before, produced by the rotation of the cam F, having the projections 46, a detailed elevation of which is shown in Fig. 17. A vertically-moving slide 47 surrounds the cam, having a stud 48 and a retracting-spring 49, Fig. 1. This slide is connected to an arm 50, having a pawl 51. A quadrant-ratchet 52 forms part of or is secured to the lever 43, so that at each downward motion of the slide 47 the pawl engages with the quadrant, and the lever 43 being connected to the shoe-standard the latter is slightly lifted three times during each rotation of the cam and drops three times by the tension of the spring 45 the same distance alternately. This eases the pressure on the shoe and enables the workman to turn the horn.

The shoe-guide J, before referred to, is adjustably secured to the main frame at the front just below the opening through which the wire is fed and adjacent to the top of the shoe-horn, when the latter is pressed upwardly. This guide is shown in detail in Figs. 8, 9, and 10. A bracket 53 is secured to the main frame in which the guide is movable for adjustment. A transverse pin 54 extends through the bracket having a partial gear 55, the guide being provided with a rack 56 and tail-guide 57. A handle 58 on a pin 54 enables the guide to be adjusted inwardly or outwardly, while its vertical adjustment to adapt it to soles of different thickness is accomplished by the screw 59 in the supporting-bracket. A spring 60 holds the guide down against the screw.

The regulation or adjustment of the vertical vibration of the shoe-standard and the feeding of the proper amount of wire are accomplished by a special mechanism connected to the box 44 on such standard. This adjustment is quite independent of the stroke of the cam F, which is invariable. Figs. 1 and 2, in connection with Fig. 6, illustrate the construction referred to. On the left side of the machine the boxing 44 is connected to an arm 61, pivoted to the frame and deriving an oscillating motion from the rise and fall of the shoe-standard. To this arm is pivoted the long two-part connecting-rod 62, which extends to the upper end of the machine and is formed at its top into a rack 63. The connection between the two parts of rod 62 is a sliding one, (by means of a plate 64 and a slot 65,) so that the lower part of rod 62 may have an independent motion to a certain limited extent; limited, that is, by the upper part of said rod. The shoe-standard can therefore only rise as far as the lower rod 62 is permitted to travel. The rack engages with a pinion 66 upon a transverse oscillating shaft 67, the latter carrying a cam 68. This cam is turned by the upward movement of the rods 62 until it strikes an adjustable stop 69 on bar 74. The stop is held by a screw and can be placed at any angle relatively to the cam 68, so as to limit the stroke of the rods 62 at any point desired. Fig. 1 shows this device clearly, the stop being shown in dotted lines. This adjustment is made when the work commences and remains unchanged as long as soles of the same thickness are being nailed. The workman, by depressing treadle I, raises the shoe as far as it will go and adjusts the shoe-guide. The same movement turns the cam 68 to a certain point, which is the proper limit of motion.

The middle cam E of the series of three at the right side of the machine drives the mechanism for feeding the wire from which the nails are cut and which is located upon the movable or swinging part of the frame. The cam is like those before described, having three projections which bear upon and move vertically a surrounding slide 70, having a spring 71, Figs. 1 and 16. A vertically-moving connecting-rod 72 bears upon and lifts at each upward stroke a pivoted arm 73. This arm oscillates the slide-bar 74, to which is secured by a slot and pin a fan-shaped plate 75. The plate 75 is mounted upon a transverse pin 77 in the movable frame A', which also carries a ratchet-wheel 78, the latter being moved intermittingly by pawls 79 on the plate 75. Fig. 7, in connection with Fig. 1, shows this construction clearly. The upward oscillation of plate 75 is simply to move the pawls back to take a new hold on the ratchet; but the downward oscillation which drives the ratchet is imparted by the strong spring 80, connected to the frame and to the plate 75, at each release of the connecting-rod 72 by the actuating-cam—that is, three times at each rotation of the cam.

The other end of the pin 77 has mounted upon it a spur-gear 81, which is the driving-wheel for actuating the series of connected pinions 82, 83, 84, and 85 on the shafts of the feed rollers or wheels 86, 87, 88, and 89. These rollers are arranged in upper and lower pairs, Fig. 11, and have grooved circular edges, between which the wire is tightly clamped and fed downward through the channel or passage 90 in the movable part of the frame, so as to emerge at a point in close proximity to the tip of the horn. Fig. 27 shows a reel for the wire mounted at the top of the frame, and in connection with Fig. 11 clearly indicates the relative position of these parts.

The boxes in which the front feed-rollers are journaled are adjustable toward and from the rear rollers, as shown in Figs. 3 and 11. The boxes are guided in a recess in the front of the movable frame A'. Plates 91 bear upon both boxes, which can be pressed inward by a cam 92, mounted upon a pin 93 and operated by a handle 94. The spring 95 throws the plates 91 outward as the cam is released, while another spring 96 (dotted lines, Fig. 11) bears upon both boxes for the same purpose.

The invariable stroke of the cam E and its connecting-rod 72 is changed into a regulated stroke of the plate 75 by means of the stop 69 and cam 68, before described, in order to feed and drive only the proper amount of wire. When the cam 68 is first adjusted by the upward movement of the shoe-standard, it is locked in place as soon as the machine is thrown into gear by the brake mechanism shown in Figs. 22 and 23. On the shaft 67 is a brake-wheel 117, having a grooved periphery. In a boxing 118 is secured a strap 119, having a curved V-shaped inner edge in proximity to the wheel. A brake-shoe 120 slides in the box and is forced constantly away from the wheel by springs 121 in slots formed in the shoe and which bear against studs 122 projecting from the box 118 into the slots. A cam 123 is secured to a pin 124, mounted in the boxing 118. One end of a rock-shaft 125, mounted in the rear upper end of the main frame, is connected to the lever C, which controls the main clutch, by a rod $C^3$, Fig. 2. The movement necessary to operate the clutch pulls down this rod and rocks the shaft 125. The other end of the rock-shaft has a crank 130, connected by adjustable arms 126 127 to a crank 128, secured to the pin 124. When the clutches are engaged, the rod C³ is pulled down, the cam 123 is turned, and the brake-shoe forced against the brake-wheel, squeezing the latter between the shoe and the strap 119 and stopping the shaft 67, with the cam 68 in proper position, and also stretching the spring 80, which actuates the plate 75. The cam remains in this position until readjusted by a shoe of a different thickness of sole.

It will now be understood from the foregoing that the slide 74, connected to the plate 75, which drives the feed-ratchet, can only move down in driving and feeding until the stop 69 strikes the cam 68, and that distance will be exactly proportionate to the thickness of the sole producing such a movement of the feed-rollers as will feed exactly the proper amount of wire for that thickness. The actuating-spring 80 is connected at one end to the crank 130, which becomes a fixed part of the main frame as long as the brake is set.

It will be understood that at the downward movement of the plate 75 the proper length of wire is not only positively fed by the rollers, but is also forced directly into the sole without any rotary or screw action, such as is usually employed in nailing-machines where threaded wire is used. Nails so forced in are held more permanently than is the case where each nail is screwed in so as to form its own female thread in the leather. In the latter case the nails are liable in time to work loose in the thread thus formed. Where the nails are driven in, on the contrary, the threads of the wire enter between the fibers of the leather and are thereby held so firmly that it is practically impossible for them to wear or work loose.

The last step in the operation of nailing is the cutting off of the wire close to the sole after each nail has been driven. To facilitate the driving of the wire into the leather, each nail is formed with a chisel-point, and I have devised cutters which, while they cut a nail just driven squarely off even with the sole, will at the same time form the chisel-point upon the nail which is to be driven next. These cutters reciprocate just below the point where the wire emerges from its feed channel or passage and just above the shoe-guide. The position of these cutters relatively to the whole machine is best shown in Fig. 3, while for details of their construction and movements reference is made to Figs. 2, 4, and 5 and Figs. 11 to 14, inclusive. These cutters K are driven primarily by the cams G G', before referred to, which are mounted near the left end of the transverse shaft which carries and drives the other cams already described. They constitute really a double cam and give a reciprocating vertical motion to a double slide K', formed of the slotted plates secured together and having upper and lower projections 100 101, Fig. 4. The inclines 102 103 on the respective cams are set slightly out of line with each other, so that a slight interval elapses after one incline 102 has thrown the slide in one direction before an incline 103 throws it in the opposite direction. Fig. 4 makes this clear. An incline 102 has just thrown the slide up and is on the point of releasing it, while an incline 103 is on the point of striking the shaded projection 101 at the lower part of the slot in the slide in order to move the slide down. The connections from the slide for operating the cutters are shown in Fig. 2. An arm 104 is secured to the slide, projecting upwardly through a fixed guide 105. To this arm is adjustably connected by a slot and pin a series of swinging arms 106 107 108, the last of which receives an oscillatory motion which it communicates to the transverse shaft 109, to which it is secured and which rocks in the main frame. Upon this shaft is a pinion 110, which engages above and below with racks 111, formed in slots in the reciprocating cutter-bars K, Fig. 11. The rock-shaft thereby gives a simultaneous but opposite reciprocation to the two cutters, producing a very rapid shearing action against the wire.

The cutters proper are removable from the bars K, in order to sharpen them. Their shape will be best understood from a comparison of Figs. 13 and 14, from which it will be seen that both cutters are beveled and notched to form opposing cutting edges or shears of inclined or beveled shape. These cut the wire simultaneously, so as to remove from opposite sides small triangular pieces of waste metal, the result being the formation of a double beveled or chisel point on the wire being fed and a squarely-cut-off nail in the shoe. The forward ends of the cutter-bars are guided by a strap 112, secured to the frame and having a hole through which the wire passes. The racks and pinion form guides for the rear ends of the cutter-bars.

The wire fed by this machine may be of any desired kind; but I prefer to use brass wire of triangular cross-section formed with a thread extending spirally, so that alternating projections and notches are produced at the angles. This wire I have found to be the most satisfactory, and, when pushed into the sole instead of being screwed, nails formed from it make an absolutely secure and permanent fastening.

Heretofore in this specification I stated that automatic means were provided for throwing the machine out of gear and stopping it. Such mechanism was stated to be independent of the ordinary means of throwing out the clutches—viz., the treadle 13, which when depressed releases the treadle C². When all the nails have been driven excepting the last one, it is desirable to stop the machine and ease the upward pressure of the shoe-standard preparatory to placing another shoe on the horn. At the same time the last nail must be driven and cut off accurately like the others. I have therefore provided special connections which commence to operate at the time referred to, but do not complete their work of stopping the machine until the cams have made the stroke required to feed, insert, and cut off the last nail. This mechanism is shown in Fig. 2, and is entirely independent of the mechanism so far described while the ordinary operation of nailing is going on. To distinguish these connections, therefore, I designate them on the drawings by small letters instead of numerals.

To bring this automatic mechanism into operation, the operator pushes the foot-lever $a$ inward, which operation causes the following action to take place:

First, it raises the bent pivoted arm $e$ into the path of the three projecting studs or rollers $c$, revolving with the gear $C^4$. This raising of the arm $e$ is done by the upward movement of the arm $f$, secured rigidly to the said lever $a$ by a screw at point $a^3$, and has a roller or stud $a^4$ projecting from its inner end, which bears upwardly against the under face of the arm $e$, holding the same raised as long as the pressure is kept upon the foot-lever $a$.

Second, the gear $C^4$, rotating in the direction of the arrow in Fig. 2, brings one of the rollers $c$ in contact with the curved upper face of the end of the lever $e$, carrying it forward until the roller $c$ disengages as it rotates upward and away from it, and pushes the slotted slide $g$ inward and out through its box $h$ far enough to allow the trigger $k$ to lock itself outside of the said box $h$, as shown in Figs. 24 and 25.

Third, the moment the operator notes that this effect has taken place and before another of the rollers $c$ upon the gear $C^4$ has had time to strike the slide $g$, which is now projecting into the path of the said rollers, he releases the foot-lever $a$, which flies back to its normal position by the coil-spring $a^5$, fastened between the bracket $b$ and the end of arm $f$, forming part of said lever $a$, and this allows the roller $c$, immediately next in rotation to the one that pushed the slide $g$ into the path of the rollers, to strike with a vibrating or glancing blow upon the upper surface of the said slide $g$, depressing it, together with its box $h$, which is pivoted upon the stud or pin $a^6$, secured to the frame of the machine, and pushing downward as well the rod $m$, pivoted to the said box at its inner face and connected at its lower end to the arm $n$ on the pivot of the treadle 13. When the slide $g$, as already explained, is thrown into the path of the rollers on the gear-wheel and the machine continues working, driving and cutting off the last nail until the slide is struck by one of the rollers $c$ and the trigger released, which release takes place as the roller glides off from the face of the depressed slide $g$, striking the upper head of the trigger, causing it to close in, and allows the spring $l$ to pull the slide $g$ once more within the box $h$, but just as this takes place the machine is completely stopped, for the depressing of the rod $m$ turns the cam on the pivot-pin of treadle 13, moves the swinging catch-plate 11 outward, releasing the foot-treadle $C^2$, and permits the spring 12 to throw out of engagement the friction mechanism that connects the main shaft of the machine with the loose driving-pulley upon the outer end of same before another motion of the wire-feed mechanism can take place.

Fourth, the moving out of the friction driving mechanism also releases the brake by pushing the connecting-rod $C^3$ the reverse of the movement before described for setting the brake. As the lower end of lever C is pulled forward it strikes a projection $n'$ on a transverse rock-shaft $o$. (Refer now to Fig. 1.) The shaft $o$ extends through the frame, and on its right-hand end is an arm $p$, connected to a push-bar $q$. The purpose of the latter bar is to throw the pawl 51 out of engagement with the quadrant 52, thereby letting the shoe-standard fall. This is accomplished by a swinging arm $r$, the rocking shaft $s$ of which has a stud $t$, which, when turned, strikes and positively lifts the pawl out of engagement. All parts of the machine are now free and disengaged.

What I claim is—

1. In a nailing-machine, and in combination, a main frame having a horizontally-vibrating upper part carrying wire driving and cutting mechanism; a shaft journaled in the main frame and carrying an actuating-cam; a pivoted shoe-horn standard; a vertical shaft journaled in the main frame and extending into the movable part of the said frame; a lever secured upon said shaft and connected to said shoe-horn standard, and connections operated by said cam for moving said lever, and thereby vibrating said standard and the upper part of said frame in unison, substantially as described.

2. In a nailing-machine, a main frame having a horizontally-vibrating upper part carrying wire driving and cutting mechanism; a cam-shaft journaled in the main frame and carrying an actuating-cam; a pivoted shoe-horn standard; a vertical shaft journaled in the main frame and secured to the upper movable frame; an angular lever secured to said shaft and connected to the shoe-horn standard; and a block on one arm of said lever capable of adjustment relatively to said vertical shaft; whereby the movement of said lever, standard and movable frame, can be varied, substantially as described.

3. In a nailing-machine, a group of cams, each having an invariable stroke and all mounted upon a common shaft; in combination with a vertically-movable and oscillating shoe horn or holder; an oscillating wire feeding and driving mechanism; a reciprocating wire-cutter, and adjustable connections from said cams to said separate mechanisms, whereby the invariable strokes of the cams can produce variable strokes by adjusting such connections, substantially as set forth.

4. In a nailing-machine and in combination, a vertically-adjustable shoe horn or holder; a variable stop or cam connected thereto and adjusted by its upward movement; driving-gearing engaged and disengaged by a sliding clutch; a brake for the variable stop connected to said clutch and set by its engagement with the driving-gearing; wire feeding and driving rollers intermittently operated; and a sliding rod for actuating such rollers having a stop to bear upon said cam, and thereby regulate the feed of the wire according to the position of said cam, substantially as set forth.

5. A work-support or shoe-holder for a nailing-machine, composed of a vertically-movable standard formed in two parts pivoted together, an oscillating extension of said standard and a shoe-horn secured to said oscillating extension, substantially as described.

6. In combination with the vertically-movable shoe horn and standard, the cam F, a reciprocating slide surrounding such cam and having a pawl and a quadrant-rack connected to said standard whereby said standard receives a vertical vibration substantially as described.

7. In a nailing-machine, and in combination a rotary cam E, a vertically-reciprocating slide, a pivoted plate carrying pawls, a ratchet-wheel, a spring for operating said ratchet-wheel, gearing connected to said ratchet-wheel, and wire-feeding rollers operated by such gearing, substantially as described.

8. In a nailing-machine, and in combination a rotary cam E, a slide-bar 74, connected to and operated by said cam having a stop 69, an adjustable cam 68, for limiting the stroke of said slide-bar, the pivoted plate 75 connected to said slide-bar and having pawls, a ratchet-wheel, wire-feeding rollers, gearing connecting the ratchet-wheel shaft to said wire-feeding rollers, and a spring for driving said ratchet and gearing when the connections between said cam and slide-bar are released by said cam, substantially as described.

9. In a nailing-machine the main frame A, in combination with the oscillating frame A', a turn-table on which said frame A' oscillates, a shaft journaled in the main frame and secured to the oscillating frame, and means for oscillating said shaft, substantially as described.

10. In a nailing-machine and in combination, a shoe horn or holder, rolls for feeding continuous wire and having a rotary motion only in a vertical plane whereby they feed and drive the wire by a single motion, and reciprocating cutters, arranged relatively to the shoe-horn and to the feeding and driving rollers so as to sever the driven portion of the wire from the continuous wire, substantially as described.

11. In a nailing-machine, wire feeding and driving mechanism, wire-cutting mechanism, an oscillating shoe horn or holder vertically movable, a shaft, having cams connected to such mechanisms, driving-gearing, a clutch for engaging and disengaging said driving-gearing, a treadle $C^2$, for causing said clutch to engage the driving-gearing, and a spring for disengaging the clutch when said treadle is released; all in combination with an independent mechanism having a supplementary treadle, but connected to the treadle $C^2$; said independent mechanism being normally inoperative, but capable of being set in such position relatively to the cam-shaft as to be acted upon by said cam-shaft, to release the main treadle, and thus to disengage the clutch mechanism, substantially as and for the purposes set forth.

In testimony whereof I have affixed my signature, in presence of two witnesses, this 26th day of December, 1894.

JOSEPH ANDREA CAVALLI.

Witnesses:
L. W. SEELY,
GEO. T. KNOX.